United States Patent [19]

Sakaguchi

[11] Patent Number: 4,620,713
[45] Date of Patent: Nov. 4, 1986

[54] FRONT FENDER OF MOTORCYCLE
[75] Inventor: Shiro Sakaguchi, Kobe, Japan
[73] Assignee: Kawasaki Jukogyo Kabushiki Kaisha, Hyogo, Japan
[21] Appl. No.: 603,696
[22] Filed: Apr. 25, 1984
[30] Foreign Application Priority Data Apr. 27, 1983 [JP] Japan ............................. 58-64582[U]

[51] Int. Cl.$^4$ .............................................. B62B 9/16
[52] U.S. Cl. ........................... 280/152.3; 280/154.5 A
[58] Field of Search .......... 280/152.1, 152.3, 154.5 A, 280/159; 362/72, 83; 180/219

[56] References Cited

U.S. PATENT DOCUMENTS 979,074 12/1910 Kelly .................................. 280/152.3
2,675,464 4/1954 Schuwinn .............................. 362/72

Primary Examiner—John J. Love
Assistant Examiner—Richard Camby

[57] ABSTRACT

A front fender of a motorcycle, particularly a dual purpose vehicle serving as both an ordinary motorcycle and a moto-crosser, securely connected to front forks supporting a front wheel at lower ends. The front fender includes a front section and a rear section each arcuate in shape. The two sections of the front fender are telescopically fitted one in the other so that the rear section can be moved into and out of the front section in sliding movement. The two sections can be secured to each other by securing means so that the length of the rear section projecting rearwardly of the front forks can be adjusted as desired to suit the condition in which the motorcycle is used.

2 Claims, 5 Drawing Figures

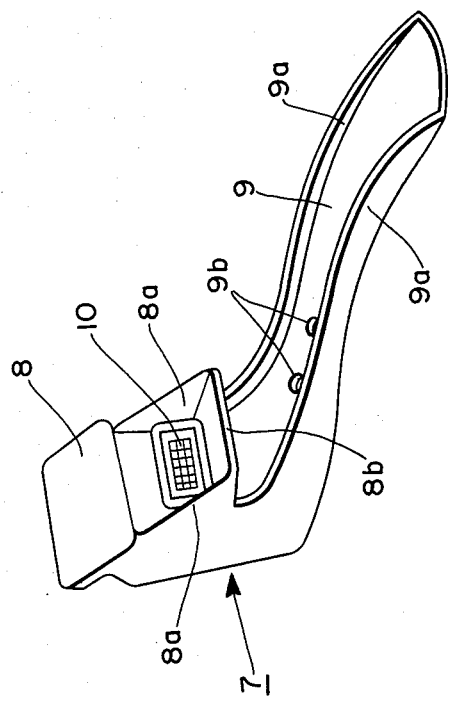
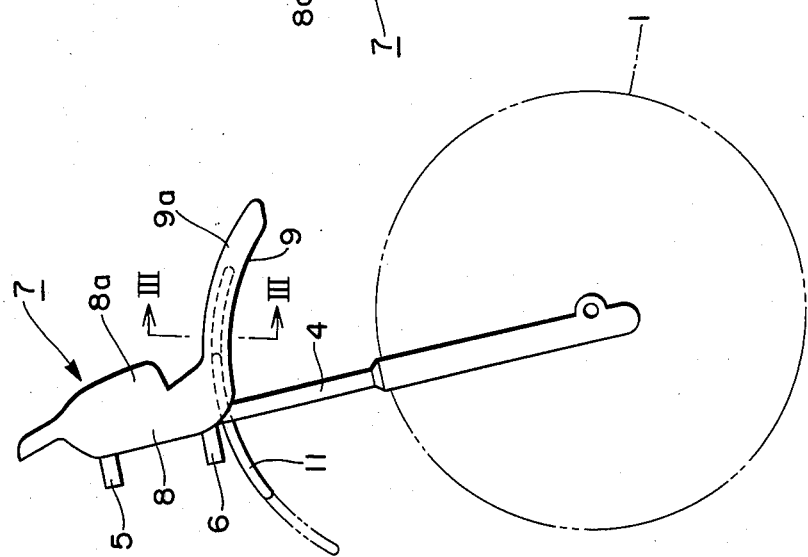

FRONT FENDER OF MOTORCYCLE

BACKGROUND OF THE INVENTION

This invention relates to a front fender of a motorcycle secured to front forks supporting a front wheel at the lower ends, and more particularly it is concerned with a front fender of a dual purpose vehicle.

In dual purpose vehicles each serving as an ordinary motorcycle and a moto-crosser, the front fender is displaced upwardly from the front wheel and has a short rear section to avoid its interference with travelling on rough road surfaces having bumps and projections when serving as a moto-crosser. Thus, when such vehicles are used as ordinary motorcycles for travelling on rainy days or over wet land, mud would be splashed against the rider and vehicle body by the front wheel because the rear portion of the front fender is too short to provide protection against it, thereby leaving the rider and vehicle body smeared with mud. Also, in dual purpose vehicles of the prior art, the front fender and the headlight cover are constructed as separate entities and secured to the front forks supporting at the lower ends the front wheel, and the headlight cover is usually designed to serve concurrently as a number plate which is indispensable to dual purpose vehicles when they function as moto-crossers. This tendency in designing dual purpose vehicles has shown no change for several years in the past and has caused the appeal of this type of vehicles to the users to decline.

SUMMARY OF THE INVENTION

This invention has been developed for the purpose of obviating the aforesaid disadvantages of the prior art. Accordingly, one of the objects of the invention is to provide a front fender of a dual purpose vehicle which is constructed such that it does not interfere with travelling when the dual purpose vehicle is used as a moto-crosser and it is capable of protecting the rider and vehicle body against splashed mud when it is used as an ordinary motorcycle.

Another object is to provide a front fender incorporating therein a headlight cover which is attractive in design and easy to maintain.

To accomplish the first object, the front fender according to the invention comprises a front section of an arcuate shape secured to the front forks, a rear section of an arcuate shape telescopically fitted in the front section of the front fender for sliding movement relative to each other, and fixing means for fixing the front section to the rear section in various relative position.

To accomplish the second object, the front fender according to the invention is constructed such that the front section of the front fender is formed integrally with a headlight cover.

By the aforesaid constructional features, it is possible to adjust the length of the rear section of the front fender to serve the purpose of use and suit the condition in which it is used. Thus, when the dual purpose vehicle provided with the front fender according to the invention is used as a moto-crosser for travelling on rough road surfaces with bumps and projections, the rear section of the front fender can be shortened by telescopically inserting it into the front section thereof to avoid the elongated rear section of the front fender interfering with travelling. When it is used as an ordinary motorcycle, the rear section of the front fender can have its length increased by telescopically withdrawing it from the front section of the front fender to protect the rider and vehicle body against splashed mud on wet roads.

By forming the headlight cover integrally with the front fender, the number of parts is reduced and maintenance is facilitated. As a result of designing the front fender in a new pattern, the vehicle provided with the front fender according to the invention would attract the attention of potential users.

BRIEF DESCRIPTION OF THE DRAWINGS

FIG. 1 is a side view of the front fender comprising one embodiment of the invention, shown as being mounted on a front fork;

FIG. 2 is a perspective view of the front cover of the front fender shown in FIG. 1;

DETAILED DESCRIPTION OF THE PREFERRED EMBODIMENTS

Figure 3:
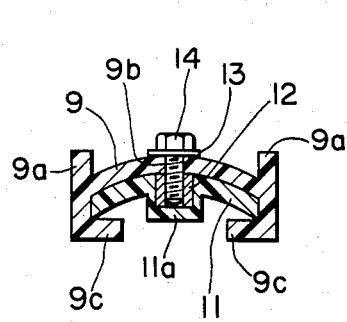
FIG. 3 is a sectional view taken along the line III—III in FIG. 1.

Preferred embodiments of the invention will now be described by referring to the accompanying drawings.

Referring to FIG. 1, the numeral 4 designates a front fork located on a right side of a body of a dual purpose vehicle. Another front fork, not shown, is located on a left side of the body in parallel relation to the front fork 4, so that the two front forks are secured at upper portions thereof to a pair of brackets 5 and 6 located in superposed relation and rotatably supported by a front end portion of a frame through a steering shaft, not shown. Handles, not shown, are secured to the bracket 5, and a front wheel 1, is rotatably supported at lower end portions of the two front forks.

The numeral 7 designates a front cover includes a front section 9 of the front fender and a headlight cover 8 formed integrally. The front cover 7 is secured to the two brackets 5 and 6 in such a manner that it encloses upper portions of the two front forks 4.

Figure 4:
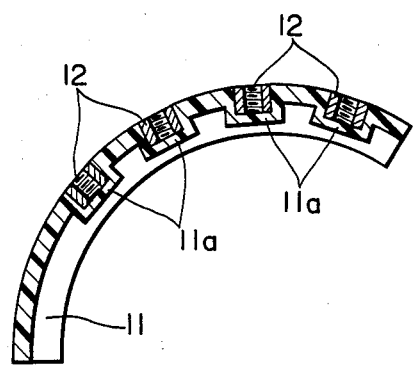
FIG. 4 is a vertical sectional veiw of the rear section of the front fender shown in FIG. 1.

Referring to FIG. 2, the headlight cover 8 includes a pair of side walls 8a located on left and right sides and extending forwardly, and a flange 8b formed integrally with the side walls 8a and extending between lower ends thereof, so that a headlight 10 is mounted in a position surrounded by the two side walls 8a and the flange 8b. A front section 9 of the front fender formed of resin is a trough-shaped member having a curved main body formed with an axially extending central portion located at a higher level than opposite side edges as shown in FIG. 3 and including a pair of streamlined side walls 9a located on the opposite side edges of the main body and extending upwardly to be contiguous with the side walls 8a of the headlight cover 8. The front section 9 of the front fender is arcuately curved along the front wheel and formed, as shown in FIG. 2, with two securing holes 9b on the axially extending central portion in a position near the headlight cover 8. The front section 9 of the front fender includes, as shown in FIG. 3, two rims 9c extending inwardly toward each other from lower ends of the left and right side walls 9a respectively to define an elongated space between a bottom surface of the main body of the front section 9 and the rims 9c to allow a forward portion of a rear section 11 of the front fender slightly smaller in width than the front section 9 to be telescopically fitted therein. A plurality (four in this embodiment) of recesses 11a (FIG. 4) are formed at a top surface of a main body of the rear section 11 in positions axially spaced apart from each other a distance corresponding to the axial distance between the securing holes 9b of the front section 9, and nuts 12 are embedded in the respective recesses 11a. When the rear section 11 of the front fender is formed of sheet metal, the nuts 12 are secured in place in the recesses 11a by welding; when the rear section 11 is formed of resin, the nuts 12 are either formed integrally with the recesses 11a or adhesively bonded thereto. When it is desired to secure the rear section 11 to the front section 9, two adjacent nuts 12 of all the plurality of nuts 12 may be suitably selected and indexed with the securing holes 9b of the front section 9, and a bolt 14 is inserted from above in each of the securing holes 9b through a washer 13 (FIG. 3) into threadable engagement with each nut 12, to thereby secure the two fender sections 9 and 11 together.

When the dual purpose vehicle provided with the front fender of the aforesaid construction according to the invention is used as a moto-crosser for travelling on rough road surfaces with bumps and projections, the rear section 11 has its forward portion telescopically moved into the front section 9 to shorten the rearward portion projecting rearwardly as indicated by solid lines in FIG. 1. When it is used as an ordinary motorcycle, the bolts 14 are loosened and the rear section 11 is withdrawn rearwardly as indicated by phantom lines in FIG. 1, and then the two sections 9 and 11 are secured together again after the securing holes 9b are indexed with the nuts 12 in suitable positions.

As shown in FIG. 2, the streamlined side walls 8a and 9a are contiguous with each other and extend along the headlight cover 8 and front section 9 of the front fender, giving the impression to the users that the vehicle can travel at high speed. This is conducive to a rise in the level at which the image of the vehicle is held. The arrangement whereby the recesses 11a are provided to the main body of the rear section 11 to allow the nuts 12 to be embedded therein eliminates the need to form in the rear section 11 openings for securing the two sections 9 and 11 together, thereby increasing the effect achieved in preventing water from seeping through the two sections 9 and 11.

Figure 5:
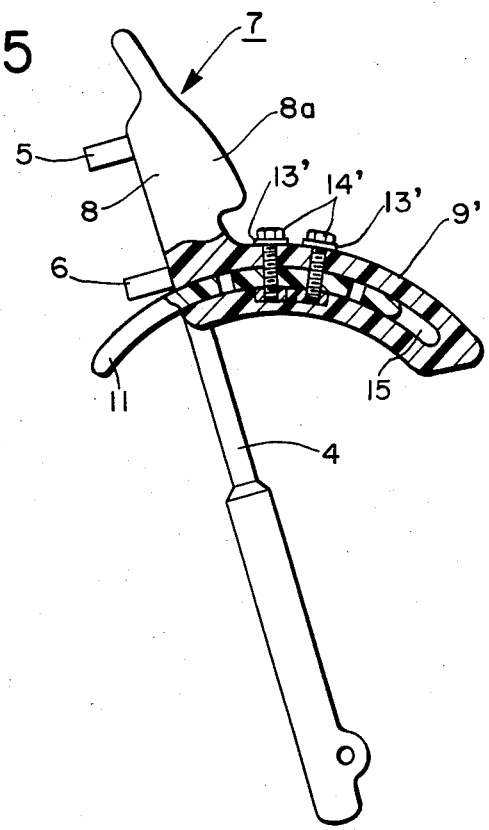
FIG. 5 is a side view, with certain parts being shown in section, of the front fender comprising another embodiment.

FIG. 5 shows another embodiment of the front fender in conformity with the invention in which the front section 9 is formed with a cavity 15 for telescopically receiving therein the rear section 11. The side walls 9a of the front section 9 shown in FIG. 1 are eliminated in the front section 9' shown in FIG. 5.

Although the front section 9 telescopically receiving the rear section 11 has been shown as having a gap between the rims 9c in FIG. 3 or having the cavity 15 in FIG. 5, the invention is not limited to these constructional forms of the front section 9 and an upper portion of the front section 9 may be open. The number of the securing holes 9b and nuts 12 embedded in the recesses 11a may be increased or decreased. Although the securing holes 9b and nuts 12 are arranged in a single row, they may be arranged in a plurality of rows longitudinally of the front fender. The positions of the securing holes 9b may be located rearwardly of those they now occupy. In place of forming the recesses 11a, through openings may be formed in the main body of the rear section 11 and the securing holes 9b of the front section 9 may be brought into index with the through openings in the rear section 11 to thereby secure the two sections 9 and 11 together by a bolt-and-nut arrangement. It is not essential to provide the side walls 8a and 9a and the flange 8b. The two sections 9 and 11 of the front fender may be formed of sheet metal by thin plate working or of an aluminum alloy by die casting. The front fender according to the invention may be used with not only a dual purpose vehicle but also exclusively with a moto-crosser or an off-road vehicle.

What is claimed is:

1. A front fender of a motorcycle, securely connected to front forks for supporting a front wheel at lower ends, comprising:
   a front section of an arcuate shape secured to the front forks and provided with an arcuate slot dividing said front section into an upper part and a lower part;
   a rear section of a fixed arcuate shape conforming to the shape of said front section and telescopically fitted in said slot in said front section for sliding movement relative to each other;
   said rear section and the upper part of said front section being provided with spaced apertures for receiving bolts and the lower part of said front section being provided with threaded recesses to receive bolts passing through said apertures for rigidly securing said front section to said rear section together in various relative positions.

2. A front fender of a motorcycle as claimed in claim 1, wherein said front section of the front fender is formed integrally with a front headlight cover positioned at about said front forks, said front section of arcuate shape projecting forwardly of said headlight cover.

* * * * *